C. L. AYGARN.
HOPPER.
APPLICATION FILED FEB. 26, 1918.
1,356,587.
Patented Oct. 26, 1920.
2 SHEETS—SHEET 2.
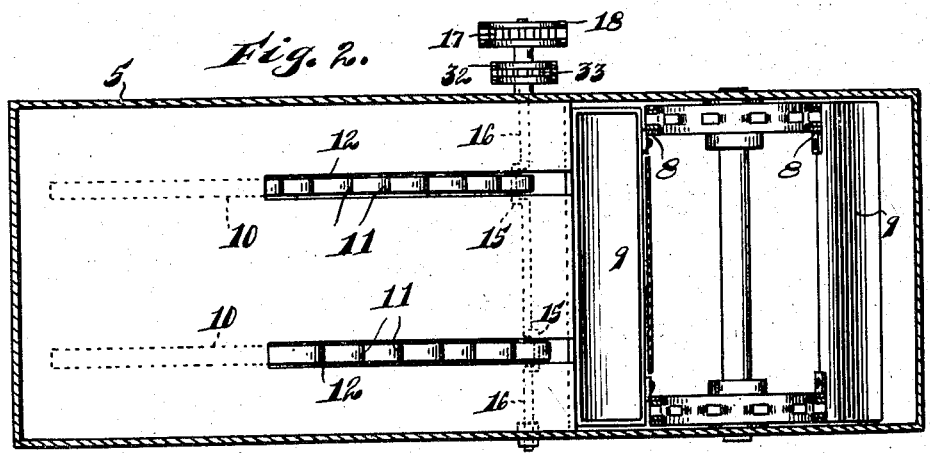
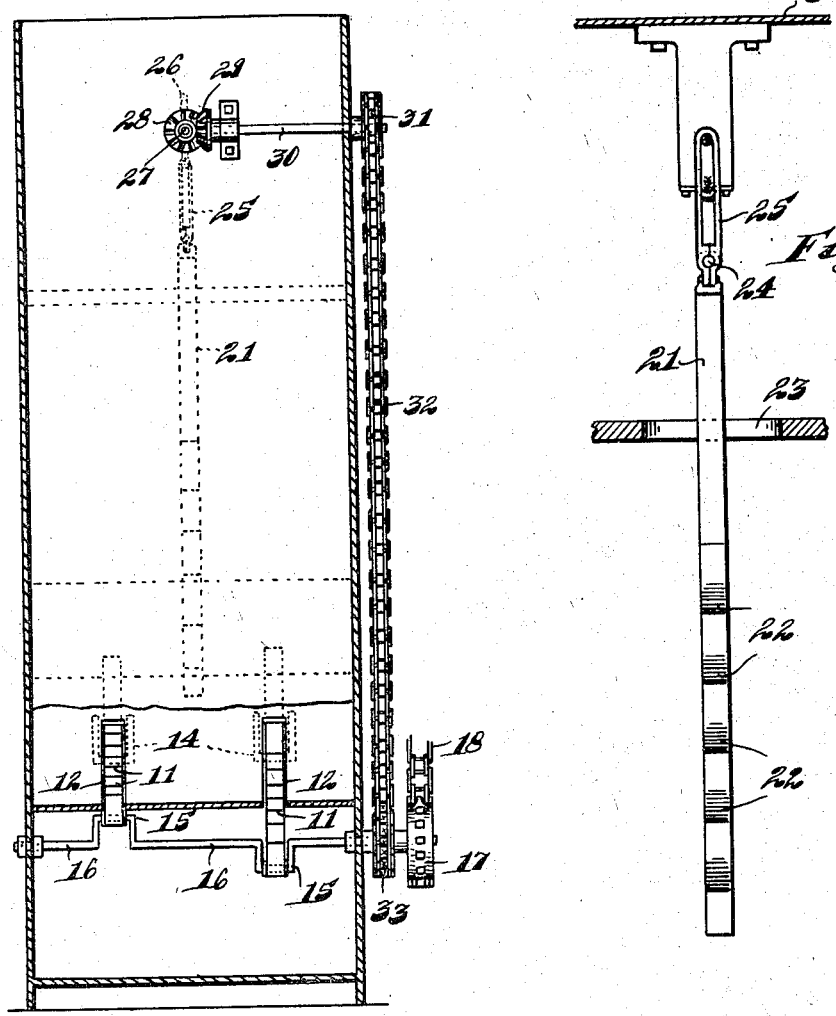

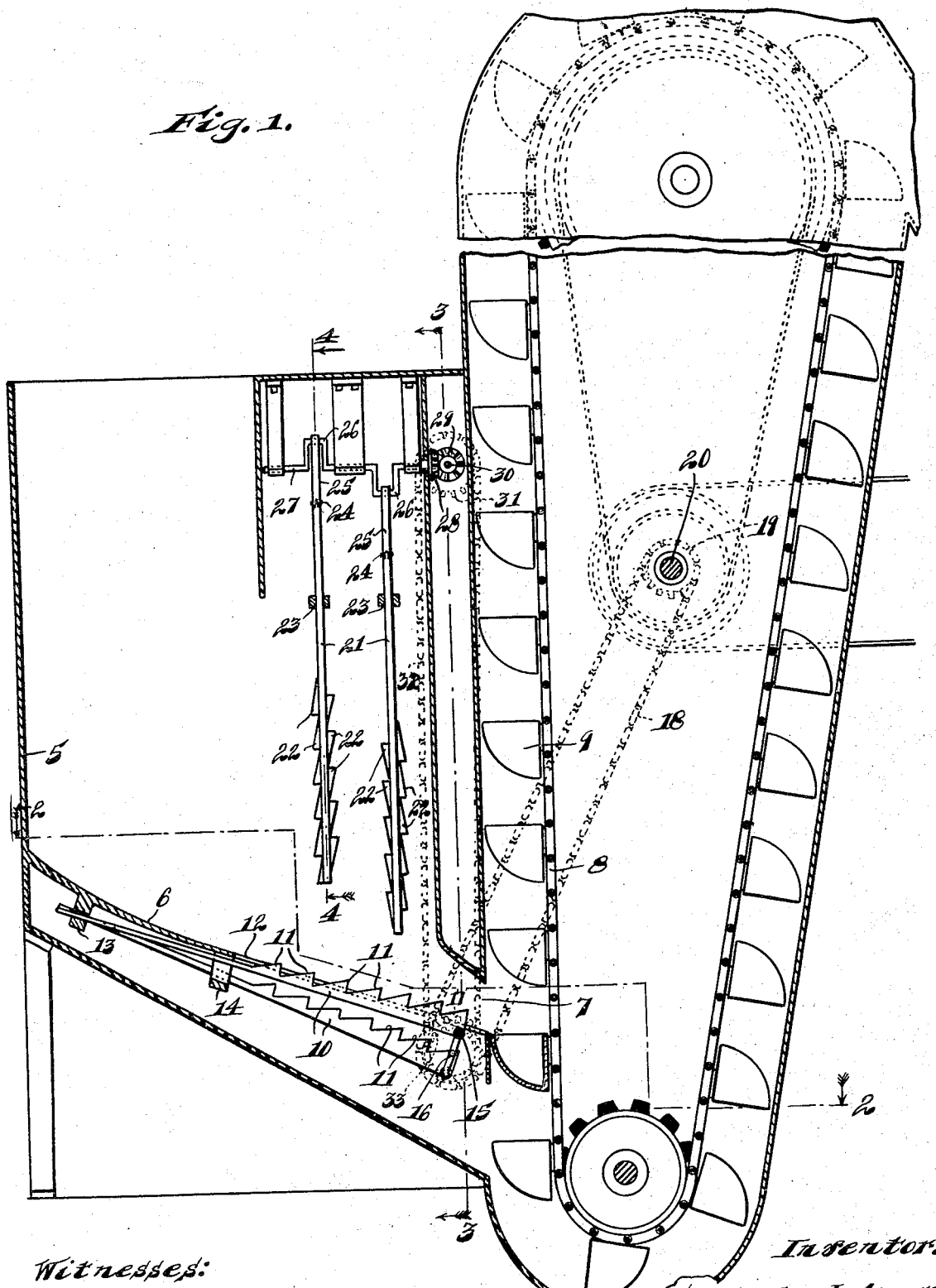

UNITED STATES PATENT OFFICE.

CHRISTOPHER L. AYGARN, OF MORRIS, ILLINOIS.

HOPPER.

1,356,587.

Specification of Letters Patent.  Patented Oct. 26, 1920.

Application filed February 26, 1918. Serial No. 219,206.

*To all whom it may concern:*

Be it known that I, CHRISTOPHER L. AYGARN, a citizen of the United States, and a resident of the city of Morris, county of Grundy, and State of Illinois, have invented certain new and useful Improvements in Hoppers, of which the following is a specification.

This invention relates to improvements in hoppers and more particularly to means designed for use in connection especially with the hoppers of corn cribs, to insure feeding of the corn toward the discharge opening of the hopper and to prevent clogging of the corn in the hopper.

The object of the invention is the production of mechanism of the character mentioned which will be of durable and economical construction and highly efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a central section through a hopper and associated elevator, equipped with mechanism embodying the invention, Fig. 2, a section taken on substantially line 2—2 of Fig. 1, Fig. 3, a section taken on substantially line 3—3 of Fig. 1, and Fig. 4, an enlarged section taken on substantially line 4—4 of Fig. 1.

The preferred form of construction as illustrated in the drawings comprises a hopper 5, the bottom 6 of which slopes toward the discharge opening 7 of the hopper. Arranged in coöperative relation with said discharge opening is an elevator 8 of the endless type, equipped with buckets 9 which are adapted to pass the discharge opening 7 of the hopper and engage and elevate the corn or other contents of the hopper discharging therefrom.

Arranged for coöperation with the bottom 6 of the hopper are feeders 10 in the form of elongated bars having ratchet teeth 11 at their upper edges adapted to project through elongated slots 12 formed in said bottom 6. The rearward or upper ends of members 10 slidably and pivotally engage with perforated lugs 13 provided at the underside of bottom 6, guides 14 coöperating with said feeder bars, intermediate the ends thereof, to insure vertical movement in a fixed plane. The front or lower ends of members 10 engage with cranks 15 formed in a shaft 16 having suitable bearings in the sides of the hopper. The arrangement is such that upon rotation of shaft 16, the feeder bars 12 will be caused to reciprocate and at the same time move vertically, the arrangement being such that said bars in the forward movement thereof, that is toward the discharge opening 7, will be elevated so that the teeth thereof will project above the bottom of the hopper in order to adapt the same to engage with the contents of the hopper and cause the same to be forced or fed toward the discharge opening. As the forward terminal of movement of each of said feeder bars is approached, the same will be carried downwardly and then rearwardly, the teeth of the bar, in the rearward movement of the latter, being positioned below the bottom of the hopper so as to permit of uninterrupted rearward travel of the bar. It will thus be seen that in the rotation of shaft 16 each feeder bar will be caused to intermittently move upwardly through the slot in the bottom of the hopper, and to advance toward the discharge opening of the hopper so as to force or feed the contents at the bottom of the hopper toward the discharge opening. The cranks 15 are preferably arranged opposite each other, that is spaced one-hundred eighty (180°) degrees apart so that the operation of the two feeder bars 10 will be alternate.

Rotation of the shaft 16 is effected by means of a sprocket wheel 17 provided at one end thereof with which engages an endless sprocket chain 18 which passes around a second sprocket wheel 19 on a power or driving shaft 20.

In order to prevent clogging of the contents of the hopper in the upper portion thereof, agitator bars 21 are provided which are mounted for vertical reciprocation in slotted guides 23. The slots in the guides 23 are elongated, as clearly seen in Fig. 4, in order to permit of relative lateral movement of said agitator bars. The lower end of each bar 21 is formed at opposite sides with oppositely facing ratchet teeth 22, so that the teeth at one side are operative in the downward movement of the bar and the teeth at the other side are operative in the upward movement of the bar.

Provided at the upper end of each agitator bar and pivotally or hingedly connected therewith, as at 24, is a strap or vertically slotted member 25 which engages with a crank 26 provided in a shaft 27 mounted in suitable bearings provided at the upper end of the hopper. The arrangement is such, as will be seen, that in the rotation of shaft 27, the bars 21 will be caused to reciprocate vertically, the result being that in the reciprocation of said bars, the teeth 22 thereof will engage with the contents of the hopper, causing agitation thereof and preventing clogging. By providing elongated slots in the members 25 which engage with the cranks 26, and by pivotally or hingedly connecting said members 25 with the agitator bars 21, in case said bars 21 become jammed in the contents of the hopper interfering with free downward movement thereof, the shaft 27 will be permitted to continue rotating without effecting movement of said bars. In other words, said bars, in the latter case, will be permitted to remain in elevated stationary position and the shaft 27 to rotate uninterruptedly, the construction being such that said shaft 27 causes upward movement or elevation of the agitator bars, downward movement of said agitator bars being by gravity.

Driving of shaft 27 is effected by means of meshing bevel gears 28 and 29, the latter being fixed to a shaft 30 carrying a sprocket wheel 31 which is operatively connected by means of an endless sprocket chain 32 with a sprocket wheel 33 on the shaft 16.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a hopper of the class described, of a vertically movable agitator; a crank for actuating said agitator; and a pivotally mounted member at the upper end of said agitator having a vertically elongated slot engaged by said crank, substantially as described.

2. The combination with a hopper of the class described, a vertically movable agitator having two sets of oppositely facing teeth thereon; a crank for actuating said agitator; and a pivotally mounted member at the upper end of said agitator having a vertically elongated slot engaged by said crank, substantially as described.

3. The combination with a hopper of the class described, of a vertically movable agitator having two sets of oppositely facing teeth thereon; guides secured to said hopper adapted to loosely engage with said agitator; a crank for actuating said agitator; and a pivotally mounted member at the upper end of said agitator having a vertically elongated slot engaged by said crank, substantially as described.

In testimony whereof I have signed my name to this specification in the presence of two subscribing witnesses.

CHRISTOPHER L. AYGARN.

Witnesses:
JOSHUA R. H. POTTS,
HELEN F. LILLIS.